United States Patent
Rupley, II et al.

(10) Patent No.: US 7,428,631 B2
(45) Date of Patent: Sep. 23, 2008

(54) APPARATUS AND METHOD USING DIFFERENT SIZE RENAME REGISTERS FOR PARTIAL-BIT AND BULK-BIT WRITES

(75) Inventors: Jeffrey P. Rupley, II, Round Rock, TX (US); Edward A. Brekelbaum, Austin, TX (US); Bryan P. Black, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 10/632,432

(22) Filed: Jul. 31, 2003

(65) Prior Publication Data

US 2005/0027968 A1 Feb. 3, 2005

(51) Int. Cl.
G06F 9/30 (2006.01)
G06F 9/40 (2006.01)
G06F 15/00 (2006.01)

(52) U.S. Cl. ................ 712/217; 712/216
(58) Field of Classification Search .......... 712/217, 712/216
See application file for complete search history.

(56) References Cited

U.S. PATENT DOCUMENTS

| | | | |
|---|---|---|---|
| 5,689,720 A | 11/1997 | Nguyen | |
| 5,974,535 A | 10/1999 | Peng et al. | |
| 6,047,369 A | 4/2000 | Colwell et al. | |
| 6,279,102 B1 * | 8/2001 | Morrison | 712/216 |
| 6,393,546 B1 | 5/2002 | Witt et al. | |
| 6,393,552 B1 * | 5/2002 | Eickemeyer et al. | 712/216 |

OTHER PUBLICATIONS

Intel Architecture Software Developer's Manual vol. 2: Instruction Set Reference, Intel, 1999.*
Joseph E. Tendler, et al., "IBM eserver: Power4 System Microarchitecture", White Paper, Oct. 2001, available at http://www-03.ibm.com/servers/eserver/pseries/hardware/whitepapers/power4.pdf.
Mitch Alsup, Web Posting dated Mar. 1, 2004, available at http://groups.google.com/group/comp.arch/browse_thread/thread/cb71c5bb39b66c86/0ca82abed7eb94a6?lnk=st&q=&rnum=1&hI=en#0ca82abed7eb94a6.
International Search Report for PCT/US2004/023235 Mailed Dec. 22, 2005.

* cited by examiner

Primary Examiner—Niketa I. Patel
Assistant Examiner—Jesse Moll
(74) Attorney, Agent, or Firm—Blakely, Sokoloff, Taylor & Zafman LLP

(57) ABSTRACT

An apparatus and method are provided for renaming a logical register for which bit accesses of varying lengths are permitted, such as a predicate register. Rename logic supports renaming for both partial-bit accesses and bulk-bit accesses to bits of the register. Rename logic utilizes a rename map table associated with the logical register to be renamed and also includes a plurality of physical rename registers. They physical rename registers include a set of skinny physical rename registers to be used for renaming for partial-bit writes. The physical rename registers also include a set of fat physical rename registers to be used for renaming for bulk-bit writes. Additional sizes of physical rename registers may also be employed. The entries of the single physical rename map table may point to either fat or skinny physical rename registers.

14 Claims, 10 Drawing Sheets

5) mov pr.rot = *immed* → mov F1 = *immed*

APPARATUS AND METHOD USING DIFFERENT SIZE RENAME REGISTERS FOR PARTIAL-BIT AND BULK-BIT WRITES

BACKGROUND

1. Technical Field

The present disclosure relates generally to information processing systems and, more specifically, to register renaming for all bits or specified bits of a logical register with multiple accessible bit fields.

2. Background Art

Compiled or assembled software instructions reference certain logical registers defined in the instruction set for a target processor. Register renaming is the remapping (renaming) of logical registers to physical registers. Register renaming is used to increase the number of instructions that a superscalar processor can issue in parallel. Superscalar processors attempt to exploit instruction level parallelism by issuing multiple instructions in parallel, thus improving performance. Register renaming improves performance of code not specifically compiled for a superscalar processor because such code tends to use logical registers in ways that reduce the amount of parallelism available.

The instruction set for a processor typically includes a limited number of available logical registers (the number of logical registers being less than the number of physical registers available in the processor). As a result, the same logical register is often used in compiled code to represent many different variables, although only one variable is represented by a logical register at any given time. Because the same register is used to represent different variables, the values of these variables are independent. Renaming each of these independent uses of a logical register to different physical registers allows multiple variables to exist concurrently in the physical registers. This renaming prevents dependence-induced delays by removing WAR (write-after-read) and WAW (write-after-write) dependencies and by allowing multiple independent instructions that utilize the same logical register to be issued concurrently.

Some processors, such as the Itanium® and Itanium II® microprocessors available from Intel Corporation in Santa Clara, Calif., include one or more registers for which partial-bit access is permitted. For example, the Explicitly Parallel Instruction Computing ("EPIC") architecture utilized by Itanium® and Itanium II® microprocessors features a predicate register (sometimes referred to herein as "PR") that contains 64 separate predicate bit fields to support predication.

Predication is a method of converting control flow dependencies to data dependencies. In general, a predicated instruction is associated with a single-bit "predicate" that controls the execution of the instruction. The processor commits the semantic results of a predicated instruction only if that instruction's predicate bit is true.

Each field of the predicate register may hold a predicate value for a specific instruction. The value in a bit of the predicate register therefore indicates whether or not conditional execution of the associated instruction should occur.

For at least one embodiment, the bits of the PR may be accessed singly or in pairs. In addition, the upper 48 bits of the PR may be accessed by a single instruction. Also, all bits of the PR may be accessed by a single instruction. A single bulk renaming of the PR register to a physical register may lead to unnecessary stalls between two instructions that access different bits or bit-pairs within the PR.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for renaming for a register with multiple bit fields.

DETAILED DESCRIPTION

Described herein are selected embodiments of an apparatus and method related to renaming a register for which bit accesses of varying lengths are permitted. In the following description, numerous specific details such as processor types, register lengths, instruction formats, and instruction operation have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

As is stated above, bulk renaming of a register for which bit accesses of varying lengths are permitted may lead to unnecessary stalls for later instructions sourced to single bits or to bit-pairs of the register. Embodiments of the method and apparatus disclosed herein address this and other concerns related to renaming registers for which bit accesses of varying lengths are supported.

Figure 1:
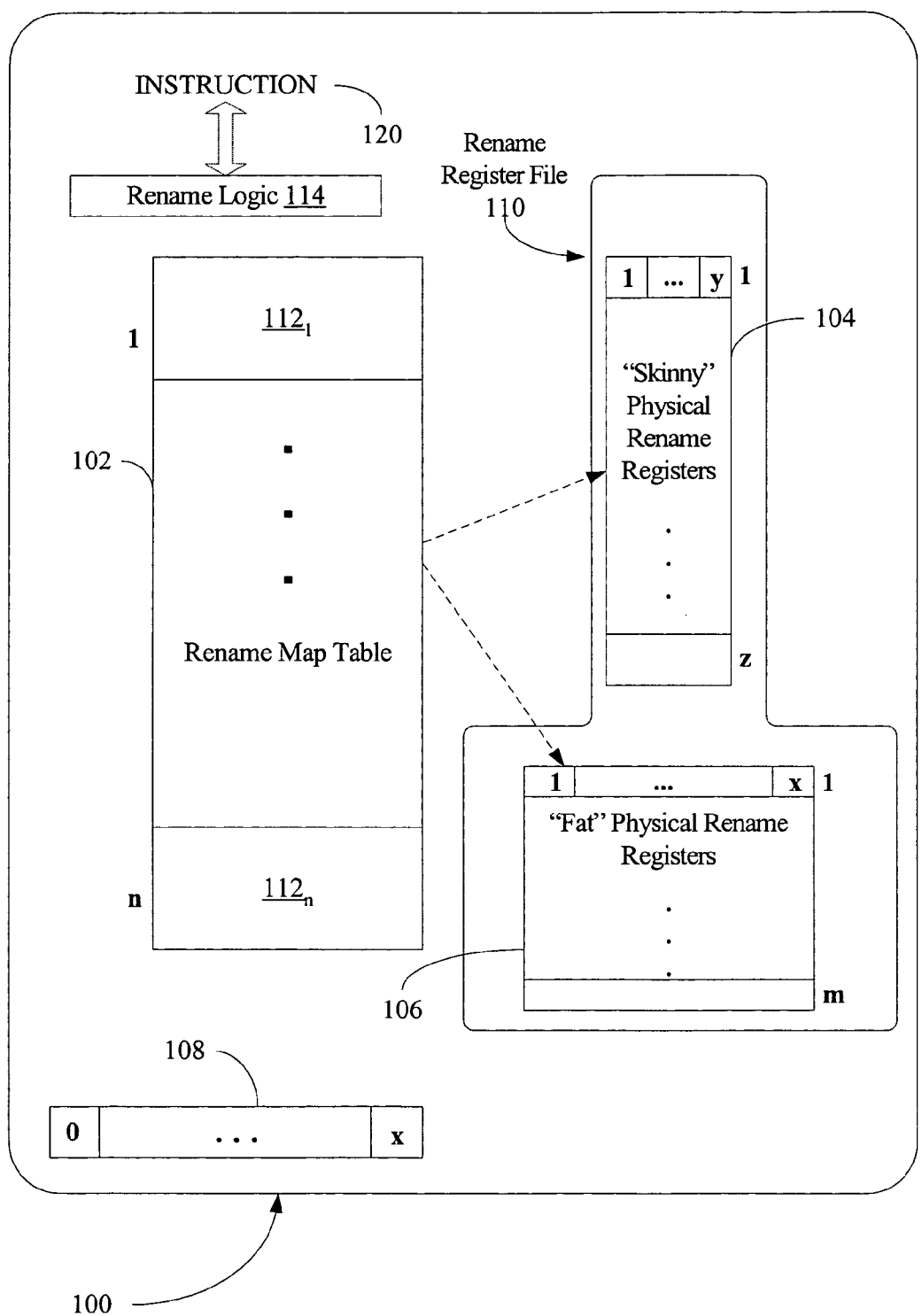
FIG. 1 is a block diagram illustrating at least one embodiment of a processor that may utilize disclosed techniques.

FIG. 1 is a block diagram illustrating at least one embodiment of an out-of-order processor 100. The processor 100 includes rename map table 102, skinny physical rename registers 104 and fat physical rename registers 106. The processor 100 also includes a predicate register 108 and rename logic 114.

Rename logic 114 performs register renaming for the one or more bits of a predicate register 108 that are indicated in an instruction 120. The predicate register 108 is an architected logical register that may be referenced in instructions of the processor 100. Predicate register 108 has multiple bit positions, each of which may hold a binary value. For at least one embodiment, predicate register 108 includes 64 bit positions. As used herein, reference to a particular "bit" of a register refers to the binary value in the particular bit position.

For at least one embodiment, the predicate register bits may be accessed in any of several manners. That is, the instruction set for the processor 100 includes several types of instructions, each of which provides for access of a different combination of the bits of the predicate register 108.

Because the bits of the predicate register 108 may be accessed in multiple combinations, it is referred to herein as a multiple-bit-field register ("MBF" register). As used herein, the term multiple-bit-field (MBF) register refers to a register for which different types of bit-specific accesses to the register are supported by the instruction set architecture.

For at least one embodiment, both partial-bit access and bulk-bit access to an MBF register, such as predicate register 108, are supported in the instruction set.

Regarding partial-bit accesses, for at least one embodiment one or more of the following types of partial-bit access are each supported by one or more instructions:
1) a single bit of the register may be accessed by a single instruction,
2) a contiguous pair (y=2) of bits may be accessed by a single instruction, and
3) a non-contiguous pair (y=2) of bits may be accessed by a single instruction.

In addition, for at least one embodiment one or more of the following types of bulk-bit access are each supported by one or more instructions:
4) all n bits of the register are accessed by a single instruction, and
5) x bits of the register are accessed by a single instruction, where n>x>y.

One skilled in the art will recognize that other types of partial-bit access may be supported in addition to, or instead of, pair (y=2) access. For instance, partial-bit access of 4 bits (y=4), 8 bits (y=8), and/or 16 bits (y=16) may be supported by instructions in the processor's 100 instruction set. These additional access types may drive the width of the skinny rename physical registers 104, which are described in further detail below. For instance, the width of the skinny rename physical registers 104 may reflect the biggest y value for which partial-bit accesses are supported.

The techniques disclosed herein also may be useful for registers for which only a subset of the above-enumerated access types are supported, as long as at least one type of partial-bit access and at least one type of larger-bit access are both supported.

Rename logic 114 performs renaming by mapping the PR 108 to a physical register in a rename register file 110. That is, for each occurrence of the PR 108 in an instruction 120 in the instruction stream of the processor 100, rename logic 114 maps such occurrence to a physical register. As used herein, the term "instruction" is intended to indicate a basic unit of work—any type of machine instruction that can be understood by a functional unit of a processor, including macro-instructions and micro-operations.

For at least one embodiment, the rename register file 110 includes two sets of physical rename registers 104, 106 that share the same name space. The first set of physical rename registers includes one or more registers 104 of a specified bit length. For at least one embodiment, the bit length for the first set of physical rename registers 104 is two bits. These registers 104 are referred to herein as "skinny" physical rename registers.

At least one embodiment of the rename register file 110 also includes a second set of physical rename registers 106. This second set of physical rename registers includes one or more rename registers 106 that is each of a second specified bit length. For at least one embodiment, the second bit length is different from the first bit length. For at least one embodiment, the bit length for the second set of registers 106 is 64 bits. These registers 106 are referred to herein as "fat" physical rename registers.

During renaming for the PR 108, the rename logic 114 may enter data into a rename map table 102. The rename map table is a storage structure to hold one or more rename entries. In practice, the actual entries of the rename map table 102 form a translation table that keeps track of mapping of logical registers, which are defined in the instruction set, to physical registers. The information in an entry 112 slot of the rename map table 102 may indicate either a skinny physical rename register 104 or a fat physical rename register 106. The physical registers 104, 106 may maintain intermediate and architected data state for the logical register being renamed.

In combination, the two sets of physical rename registers 104, 106 address renaming efficiency considerations for all supported access types for an MBF. For single-bit or bit-pair accesses to an MBF, the target bits of the MBF are renamed to "skinny" physical registers. For larger-bit accesses (such as a full-bit access), the entire contents of the MBF is renamed to a "fat" physical register. One should note that it is not required that the number (z) of skinny physical rename registers 104 equal the number (m) of fat physical rename registers 106.

Accordingly, it has been described that the rename map table 102, skinny physical rename registers 104 and fat physical rename registers 106 facilitate renaming, by rename logic 114, of a logical predicate register (PR) 108. For at least one embodiment, the predicate register 108 has a bit field for each of 64 predicate bits.

For at least one embodiment, predicate bits behave similarly to condition codes known in some architectures. The 64 bits of a PR 108, 63 of which are writeable, can be written 1) individually, 2) in contiguous pairs, 3) in non-contiguous pairs, and 4) all at once by a single instruction (except that the low-order bit cannot be written). In addition, all or some of the upper 48 bits of the predicate register may be written by a single instruction.

FIG. 1 illustrates that the rename map table 102 includes n entry slots 112, one for each of the n writeable bits of the MBF. For example, to rename a PR 108 that includes 63 architected accessible bits (that is, n=63), the rename map table 102 includes 63 entry slots 112. For an example of a rename map table 602 having 63 entries, please refer to FIG. 6.

As is stated above, at least one embodiment of the skinny physical rename registers 104 and the fat physical rename registers 106 share the same name space. Accordingly, each actual entry in an entry slot 112 of the rename map table 102 includes a type field. The value in the type field 202 of an actual entry of the rename map table 102 specifies whether the entry points to a skinny register 104 or a fat register 106. The format of entries of the map rename table 102 are discussed in further detail below.

Figure 2:
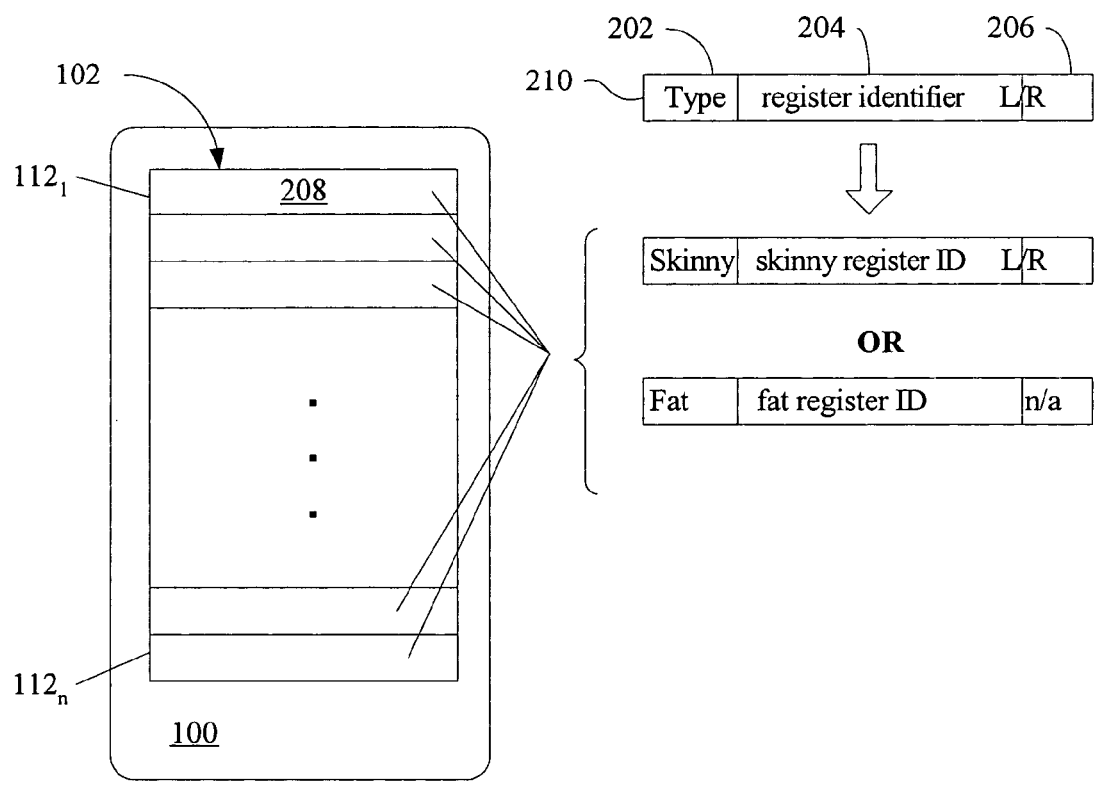
FIG. 2 is a block diagram further illustrating the format for entries of at least one embodiment of a rename map table.

FIG. 2 illustrates at least one embodiment of the format for actual entries 208 of the rename map table 102. Each actual entry 208 in an entry slot 112 is of the format 210 illustrated in FIG. 2. As used herein, the term "actual entry" 208 is used to refer to data. The term "entry slot" 112 is used to refer to a memory location in the rename map table 102 (FIG. 1) to store the actual entry 208. A slot 112 may or may not include valid data values. For instance, immediately after initialization, there may no actual entries 208 in the rename map table 102 (FIG. 2); that is, none of the entry slots $112_1$-$112_n$ will contain valid data immediately after initialization, such that there are n slots in the rename map table 102, but there are no entries 208 in the table 102.

Each entry slot 112 includes a type field 202, a register identifier field 204, and a position field 206. During renaming, data representing an actual entry 208 is placed into the fields 202, 204, 206 of an entry 112 slot. The actual entry 208 information placed into the entry slot 112 allows the processor 100 to locate the most recently-written value of one or more bits of the PR 108 (FIG. 1).

For at least one embodiment, the value in the type field 202 of an actual entry 208 indicates whether the value in the register identifier field 204 of the actual entry 208 indicates a skinny register 104 or a fat register 106. The register identifier value in the register identifier field 204 is a pointer that identifies a physical register in rename register file 110. The register identifier may point to either a skinny rename register 104 or a fat rename register 106.

As used herein, a "pointer" value is any register identifier value that identifies a particular physical register. In some embodiments, the register identifier value in the register identifier field 204 of an entry 208 of the rename map table 102 may be an address or part of an address. For at least one embodiment, the pointer value in an entry of the rename map table 102 may be an offset.

Figure 3:
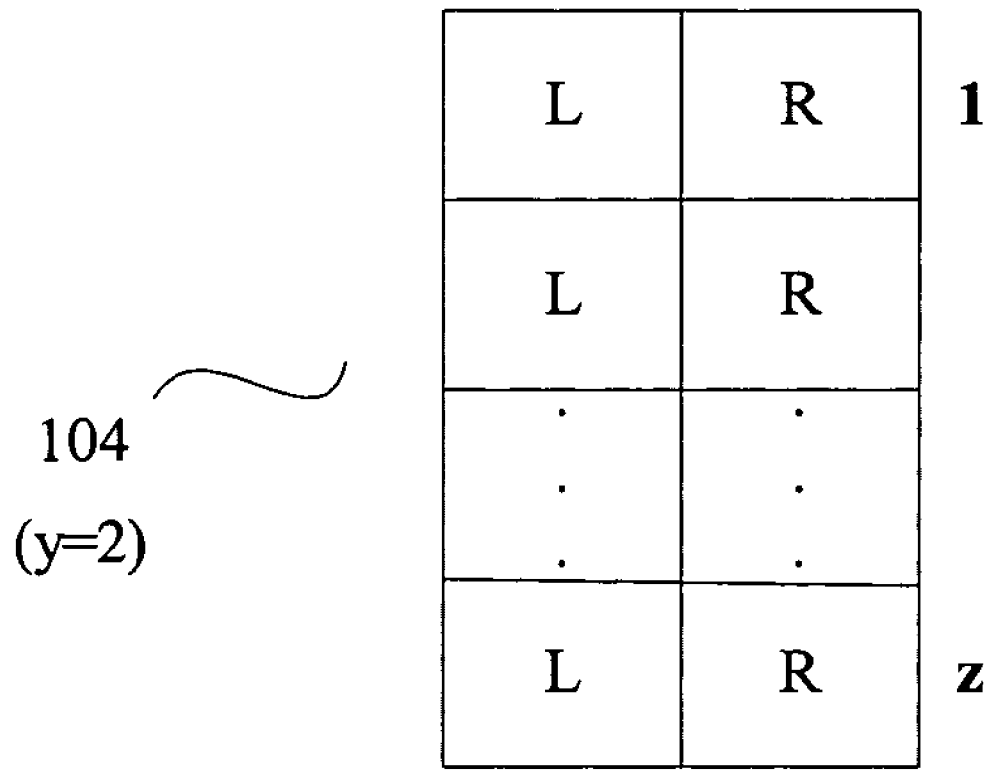
FIG. 3 is a block diagram illustrating the formats for at least one embodiment lengths are supported.

Reference is made to FIGS. 2 and 3 for discussion of the position field 206. FIG. 2 illustrates that the position field 206 contents are relevant to an actual entry 208 that points to a skinny physical rename register. For an embodiment of a skinny physical rename register 104 that includes only two bits, the position filed 206 is referred to herein as a left/right (L/R) field. That is, the value in the position field 206 for an actual entry 208 indicates either the left or right bit in a two-bit skinny physical rename register 104.

One of skill in the art will recognize, of course, that the physical rename registers 102 may be of any length. If, for example, 4-bit partial accesses are supported by the instruction set, then it may be desired that the physical rename registers 102 be of a 4-bit length. In such embodiment, the value in the position field 206 may indicate which of the four bits is desired for a single-bit access.

Accordingly, the value placed in an entry slot 112 for an actual entry 208 of the rename map table 102 includes information to identify the physical register type to which the desired predicate bit(s) have been renamed and a pointer to the physical rename register to which the desired predicate bit(s) have been renamed. In addition, if: 1) the renaming is being performed responsive to a partial-bit access instruction and 2) the number of bits to be renamed for a current partial-bit access instruction is less than y, where y is the bit length of the skinny physical rename register, then the value in the actual entry 208 also indicates which bit(s) of the physical rename register 102 is being used to rename the bits for the partial-bit access instruction.

Figure 4:
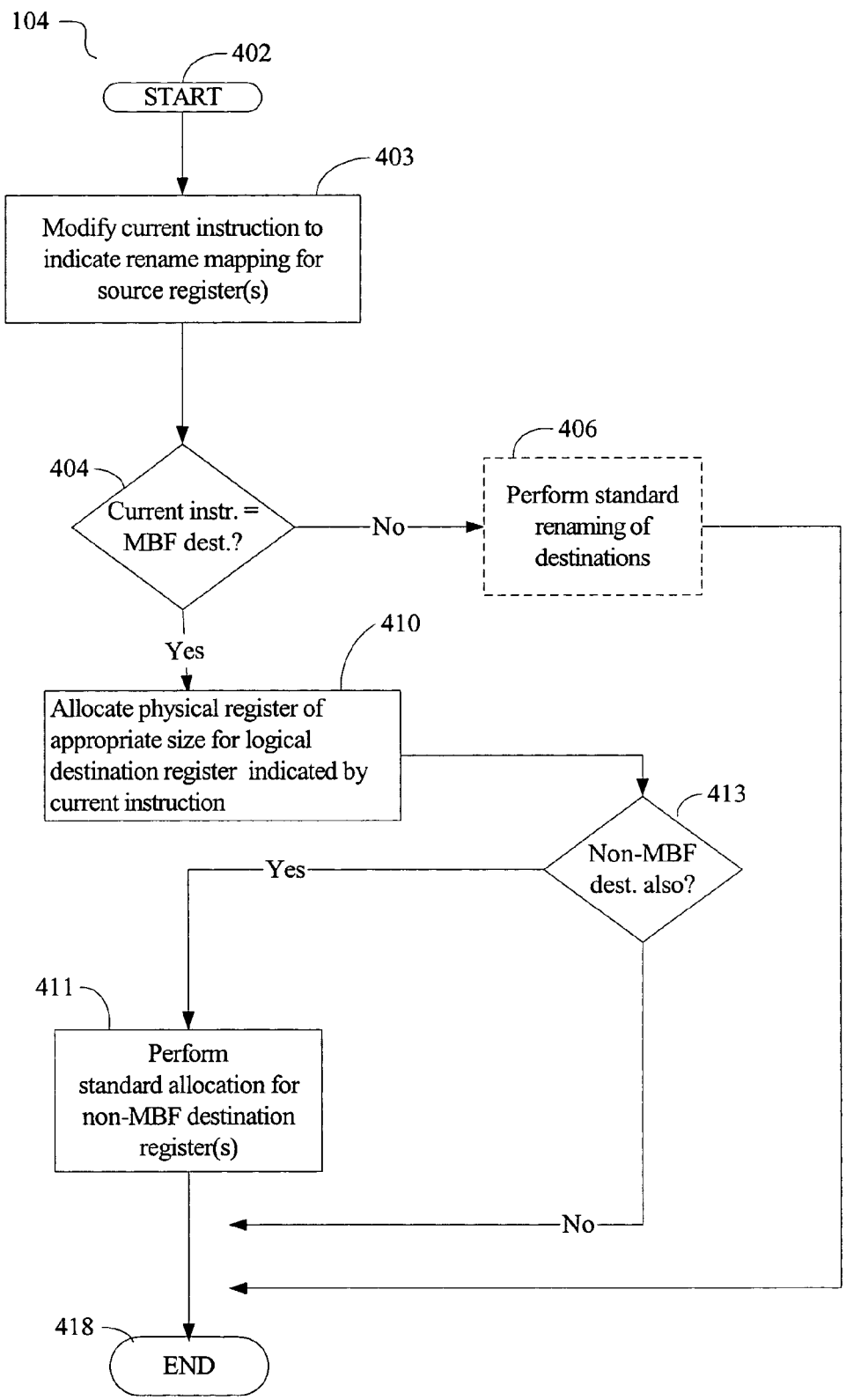
FIG. 4 is a flowchart illustrating at least one embodiment for a renaming method.

FIG. 4 is a flowchart illustrating a method 400 of renaming logical registers to physical registers. The method 400 may be performed, for at least one embodiment, by rename logic such as, for example, rename logic 114 illustrated in FIG. 1.

During the renaming method 400, actions may be taken for logical source registers and/or logical destination registers specified in a current instruction. For example, in the following illustrative instruction, logical registers denoted by r2 and r3 are source registers, and the logical register denoted by r1 is a destination registers: add r1=r2, r3. Generally, method 400 modifies the source instruction to indicate mapping for previously-renamed registers. In addition, method 400 allocates one of the registers in the rename register file 110 (FIG. 1) for MBF register(s) identified as a destination register. The mapping and allocating operations are discussed in further detail below.

FIG. 4 illustrates that operation begins at block 402 and proceeds to block 403. At block 403, the current instruction is modified to map each logical source register of the current instruction 120 to a prior-mapped physical rename register in the register file 110 (FIG. 1). If one or more logical source registers of the current instruction is not an MBF register (or a bit of such a register), then mapping 403 of the source register occurs in a known manner.

If, however, one or more of the logical source registers of the current instruction is a bit of an MBF register, then mapping is performed as follows. The predicate bit number(s) for the source register(s) are used as an index into the rename map table 102 in order to locate the entry of the map table 102 that corresponds to the logical predicate bits indicated as sources by the current instruction. For instance, if the fourth predicate bit, p4, is indicated as the source for the current instruction 120, then the fourth entry of the rename map table 102 (FIG. 1) is identified at block 403. The physical rename register identified in the rename map table 102 entry corresponding to the source predicate bit is determined. The current instruction 120 is then modified to reflect the identified physical rename register, rather than the logical register, as a source register. Processing then proceeds to block 404.

If an instruction indicates the entire predicate register as a source, then modifying 403 may handled in any of several approaches. One approach is to collate all separately renamed bits of the predicate register and modify the current instruction to indicate one or more physical registers that hold the current value for each of the bits. Implementation details of such an approach are beyond the scope of the present disclosure. Another approach for handling such bulk-bit reads of the predicate register is to wait until an instruction that sources the predicate register is the oldest instruction. When such instruction is the oldest instruction in the machine, then the value of the predicate register may be read from an architected register file.

Processing proceeds to block 404, where it is determined whether the current instruction indicates one or more MBF registers as a destination. If not, processing proceeds to block 406, where renaming for the current instruction is performed in a known manner, and processing then ends at block 418.

The processing at block 406 is optional. The optional nature of block 406 is denoted in FIG. 4 with broken lines. That is, the MBF-specific allocation 410 illustrated in FIG. 4 may be performed within a system that also supports renaming for non-MBF registers. In such case, allocation for non-MBF registers is performed at block 406. However, the method 400 may be practiced in a system regardless of whether the system performs any other renaming techniques.

If it is determined at block 404 that the current instruction indicates a write to an MBF register, then processing proceeds to block 410.

At block 410, a physical register is allocated for each MBF destination register. That is, at block 410 an appropriately-sized empty register in the register rename file 110 (FIG. 1) is selected and allocated for each MBF destination register.

Figure 5:
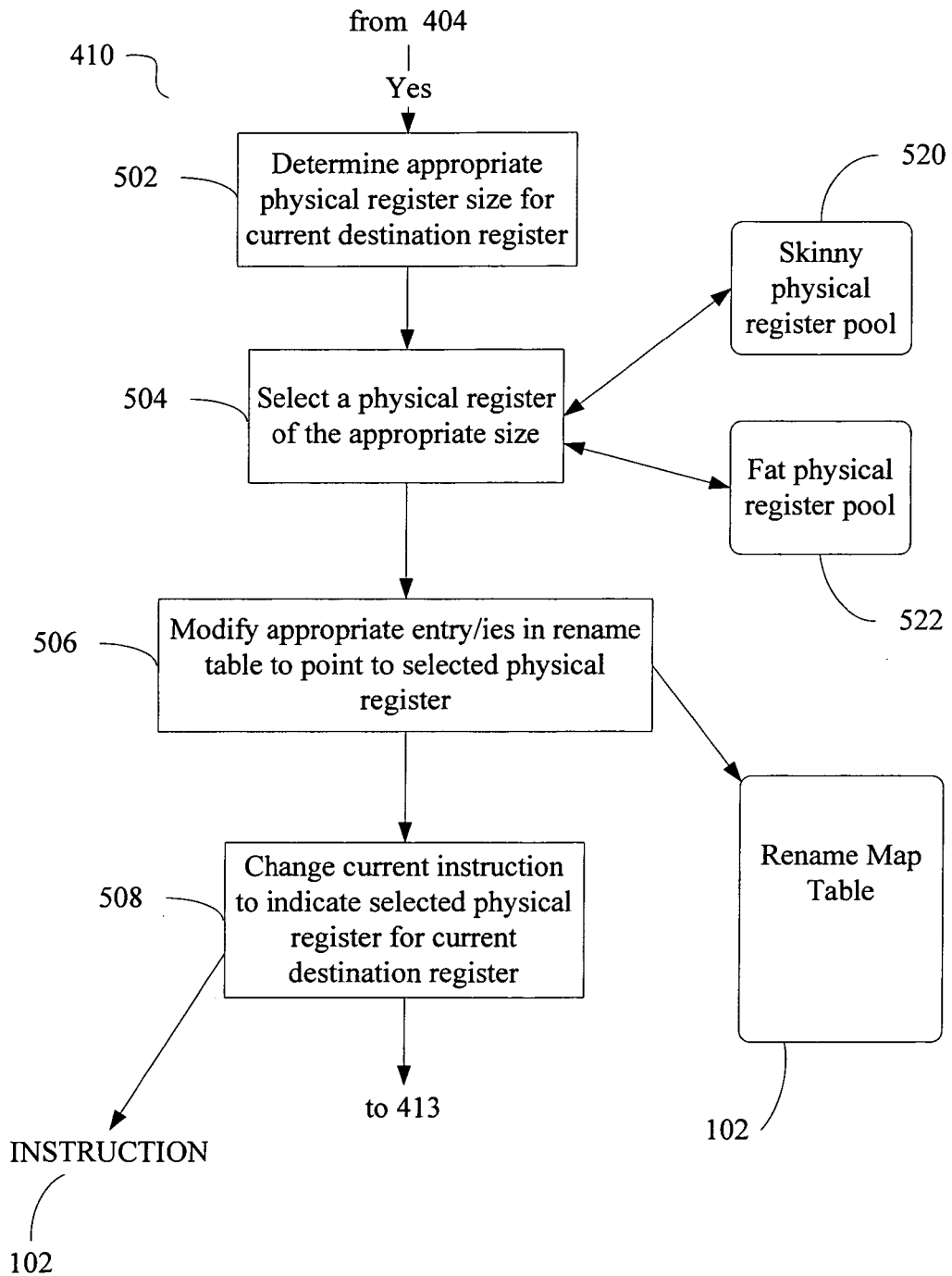
FIG. 5 is a flow diagram illustrating flow of control and data for allocation of a physical register.

Brief reference to FIG. 5 further illustrates register allocation 410 for MBF destination registers. FIG. 5 illustrates that physical register allocation 410 includes determining 502 the appropriate physical register size to be allocated for the logical register under consideration. Generally, the size of the physical register to be allocated for a logical destination register is determined 502 based on the type of bit access indicated by the current instruction. Physical register size determination 502 is discussed in further detail below in connection with the example illustrated in FIG. 6.

After the size of the appropriate physical register has been determined at block 502, then an available register of the appropriate size is selected at block 504. For at least one embodiment, the rename logic 114 (FIG. 1) maintains an indication of those of the z skinny physical rename registers 104 that are available for allocation. Similarly, the rename logic 114 (FIG. 1) also maintains an indication of those of the m fat physical rename registers 106 that are available for allocation. The available skinny registers 104 are conceptualized as a "pool" 520 of available skinny registers, while the available fat registers 106 are conceptualized as a "pool" 522 of available fat registers. For at least one embodiment, each pool 520, 522 is implemented as a FIFO (first in, first out) queue. Accordingly, for at least one embodiment, the selection 504 is performed by selecting the register at the head of the appropriate pool 520, 522 queue. The selected physical register is then removed from the pool 520, 522 as part of the selection operation 504.

At block 506, the appropriate entry slot 112 in the rename map table 102 (FIG. 1) is modified to create an entry 208 that reflects the physical register that was selected at block 504. To do so, each bit of the PR that is to written as a destination of the current instruction is used as an index to locate the corresponding entry 112 of the rename map table. For each such entry, the register identifier is modified to point to the physical register that was selected at block 504. Also, for each such entry the appropriate register type value ("skinny" or "fat") is entered into the type field 202 of the entry 208. If the register type value for an entry 208 has been modified to "skinny", then a position value is entered into the position field 208 for that entry 208. Processing proceeds to block 508 after the data in an entry slot 112 has been modified 506 for each bit of the MBF that is indicated as a destination in the current instruction.

At block 508, the current instruction 120 is modified to reflect the physical register that was selected at block 504. In this manner, the execution unit (not shown) of the processor 100 is instructed to write results of the current instruction 120 to the renamed physical register.

Returning to FIG. 4, one can see that processing proceeds from block 410 to block 413. At block 413, it is determined whether the current instruction includes one or more non-MBF registers as a source register. (A non-MBF register, as used herein, denotes an architectural register, such as a general purpose register.) If so, then processing proceeds to block 411 in order to allocate, in a known manner, a physical rename register for each non-MBF destination register(s) indicated in the current instruction.

If the current instruction does not indicate any non-MBF destination registers, then processing ends at block 418.

For illustrative purposes, the method 400 is now discussed in reference to an illustrative set of instructions. The illustrative instructions are set forth in Table 1, below.

TABLE 1

| 1. | cmp.eq p1, p2 = r2, r3 | Partial-bit instruction. Compare the two source operands in r2 and r3 to see if they are equal; produce Boolean result (1 = true/equal; 0 = false/not equal). Results are written to two destination bits in predicate register (p1, p2). p1 gets result of r2 = r3; p2 |

TABLE 1-continued

| | | gets results of r2 ! = r3. |
|---|---|---|
| 2. | cmp.eq p4, p17 = r2, r3 | Partial-bit instruction. Compare the two source operands in r2 and r3 and write results to two non-contiguous bits of predicate register |
| 3. | cmp.eq p4., p5 = r3, r4 | Partial-bit instruction. Compare the two source operands in r2 and r3 and write results to two contiguous bits of predicate register |
| 4. | p17.add r2 = r1,1 | Use source predicate bit p17 to choose whether to update destination r2 with the value of source register r1 plus 1 (Partial-bit register read for source p17). |
| 5. | mov pr = r2, mask | Bulk-bit instruction. Any one, several, or all of the PR bits may be written. More than two contiguous or non-contiguous bits may be written. Those PR bits indicated by mask are written with value in source register r2 at the appropnate position. |
| 6. | mov pr.rot = immed | Bulk-bit instruction. A fixed-length contiguous subset of the PR bits is written. Move the sign-extended source immediate value to a subset of the 48 most significant predicate register bits. Bit position i in the source operand is copied to PR[i]. |

In the following discussion, the method 400 will first be discussed in reference to the first instruction of Table 1. Thereafter, the method 400 will be discussed using the remaining instructions of Table 1 as an illustrative instruction stream.

Renaming Example for a 2-Bit Write Access to an MBF

The first instruction of Table 1 is used as an example to further illustrate the method 400 illustrated in FIGS. 4 and 5. Such instruction is an example of a partial-bit instruction that specifies write access to two contiguous bits of an MBF. The cmp.eq instruction indicates that result of the comparison of two source registers, r2 and r3, should be written to two contiguous bits, p1 and p2, of the predicate register (such as PR 108, FIG. 1).

Figure 6:
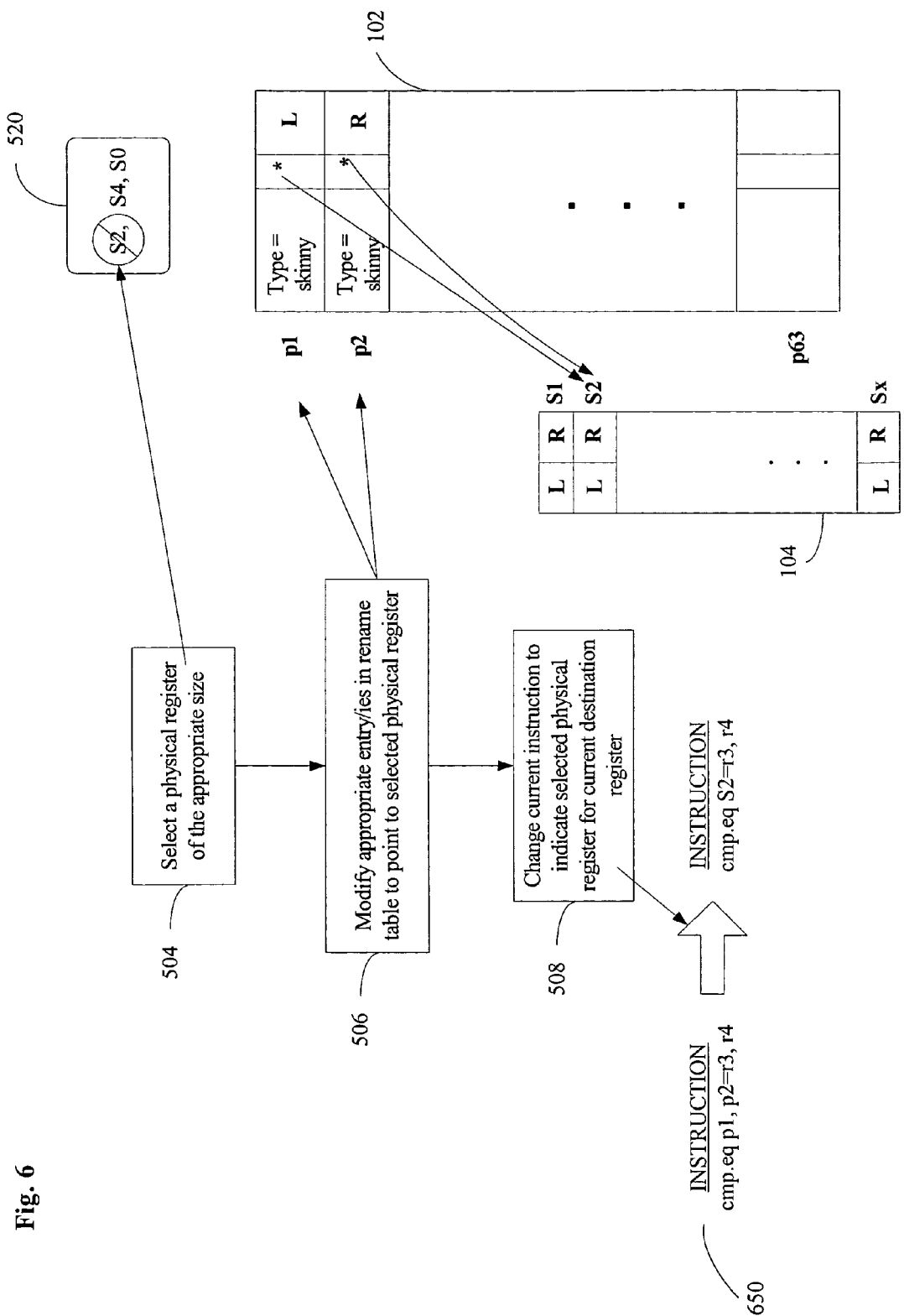
FIG. 6 is a data flow diagram illustrating flow of control and data during renaming for an example partial-bit instruction.

FIGS. 4, 5 and 6 are referenced together for further discussion of the method 400 in relation to the first example instruction, referred to as instruction 650, set forth in Table 1. FIG. 4 illustrates that, at block 403, a source register, such as r2 and r3, of the current instruction 650 is mapped to its physical rename register. For embodiments that perform renaming for non-MBF register, the mapping operation 403 is performed for a known manner for source registers that are not MBF registers. Accordingly, because current instruction 650 is not sourced to a predicate register, the rename map table 102 is not implicated at block 403 for the first instruction of Table 1.

The method 400 allocates 410 a skinny register 104 for the source operands p1 and p2. Details of this allocation 410 may be further understood with reference to FIG. 5.

FIG. 5 illustrates that the appropriate physical register size for the destination registers of the current instruction is determined at block 502. For at least one embodiment, this determination 502 is made based upon the instruction type of the current instruction. If the current instruction indicates a partial-bit write to the predicate register, then it is determined that a skinny register 104 is appropriate. If, on the other hand, the current instruction were to indicate a bulk write to the predicate register, then a fat register 106 would be appropriate. (Of course, if the current instruction does not indicate an MBF register as a destination for the instruction, then 408 would evaluate to false and block 410 would not be performed for the current instruction).

In the case of the first instruction of Table 1, two bits of the predicate register 108 (FIG. 1), p1 and p2, are to be written, so it is therefore determined at block 502 that a skinny register 104 is appropriate.

FIG. 6 illustrates that, at block 504, a skinny physical rename register 104 is selected from the skinny register pool 520. An illustrative skinny register pool contents is illustrated in FIG. 6. FIG. 6 illustrates that the skinny register pool 520 includes skinny physical rename registers S2, S4 and S0, which are available to be used for renaming. FIG. 6 illustrates that, at block 504, the first available skinny register, S2, is selected from the pool 520. The selected register S2 is deleted from the pool 520.

At block 506, the rename map table 102 is modified. The appropriate entry of the map table 102 is identified in relation to the logical destination register(s) indicated by the current instruction 650. For at least one embodiment, the bit position of the predicate bit indicated in the instruction 650 is used as an index into the rename map table 102. For example, the first and second entries of the rename map table 102 may correspond to predicate bits p1 and p2, respectively. Accordingly, the first and second entries of the rename map table 102 are modified at block 506.

Because the current instruction 650 is a partial-bit instruction for which a skinny register S2 was selected at block 504, the type field 202 (FIG. 2) for each of the first and second entries of the rename map table 102 is modified to indicate that the register identifier in the entry points to a skinny register 104 (FIG. 1). The first entry of the map rename table 102 is modified to point to the skinny register, S2, that was selected at block 504. The position field 206 (FIG. 2) for that entry is modified to indicate which of the y positions of S2 is allocated for the first predicate bit. Similarly, the second entry of the map rename table 102 is also modified to point to the skinny register, S2, which was selected at block 504. Again, the position field 206 (FIG. 2) for the second entry is modified to indicate which of the y positions of S2 is allocated for the second predicate bit.

As a result of the above processing, the left bit of the skinny register S2 is allocated for renaming of predicate bit p1, while the right bit of the skinny register S2 is allocated for renaming of predicate bit p2. At block 508, the instruction 605 is modified to reflect such renaming allocations. Accordingly, at block 508, both predicates of the current instruction 650 are replaced with the selected skinny register: cmp.eq S2=r2, r3.

Renaming Example for Illustrative Sequence of Instructions

The remaining instructions of Table 1 are used an example instruction stream to further illustrate the method 400 illustrated in FIGS. 4 and 5. The instructions listed in Table 1 are intended for illustrative purposes only, and are not intended to limit applicability of disclosed techniques to any particular instruction set, instruction syntax or instruction format.

FIGS. 4, 5, 7, 8 and 9 are referenced together for further discussion of the method 400 in relation to the following sample instruction stream: 1) cmp.eq p4, p17=r2, r3; 2) cmp.eq p4, p5=r3, r4; 3) p17.add r2=r1, 1; 4) mov pr=r2, mask, and 5) mov pr.rot mask. For purposes of this illustrative discussion, it is assumed that example skinny register pool 520 includes three skinny physical rename registers in the following FIFO order: S2, S4, S0. It is also assumed that fat register pool 522 includes two fat physical rename registers 106 in the following FIFO order: F4, F1.

For instruction 1 of the sample instruction stream, predicate bits are indicated as destination registers but no predicate bits are sourced. Accordingly, processing for sample instruction 1 is similar to that discussed above for the first instruction of Table 1.

Figure 7:
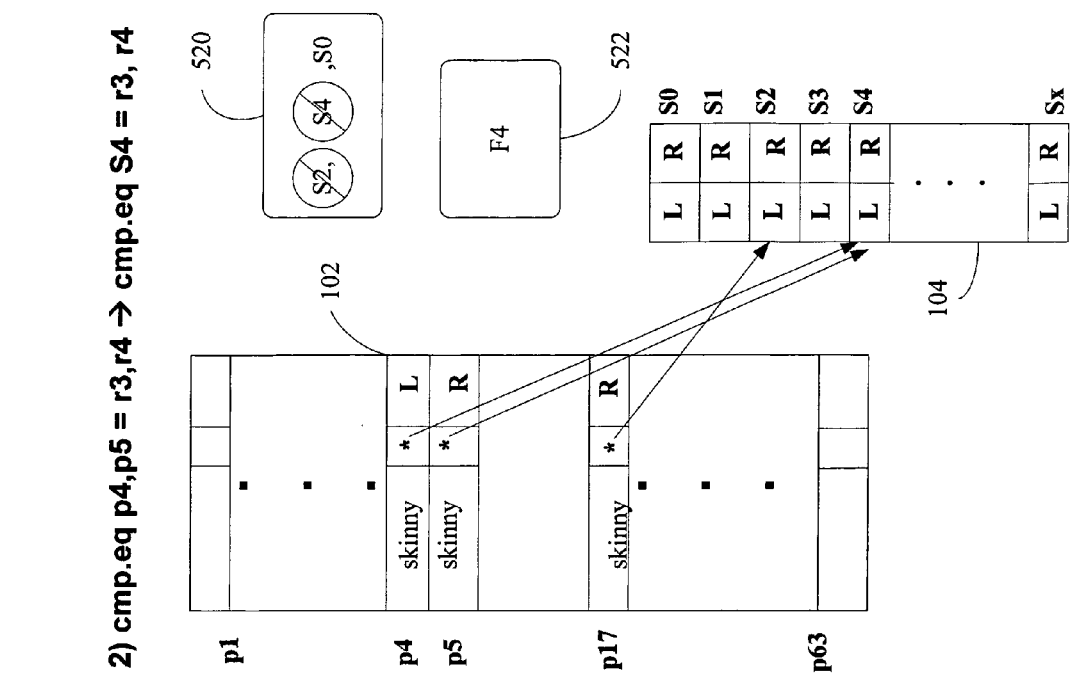
FIG. 7 is a data flow diagram illustrating flow of data during renaming for two sample instructions in an example instruction stream.
Figure 7:
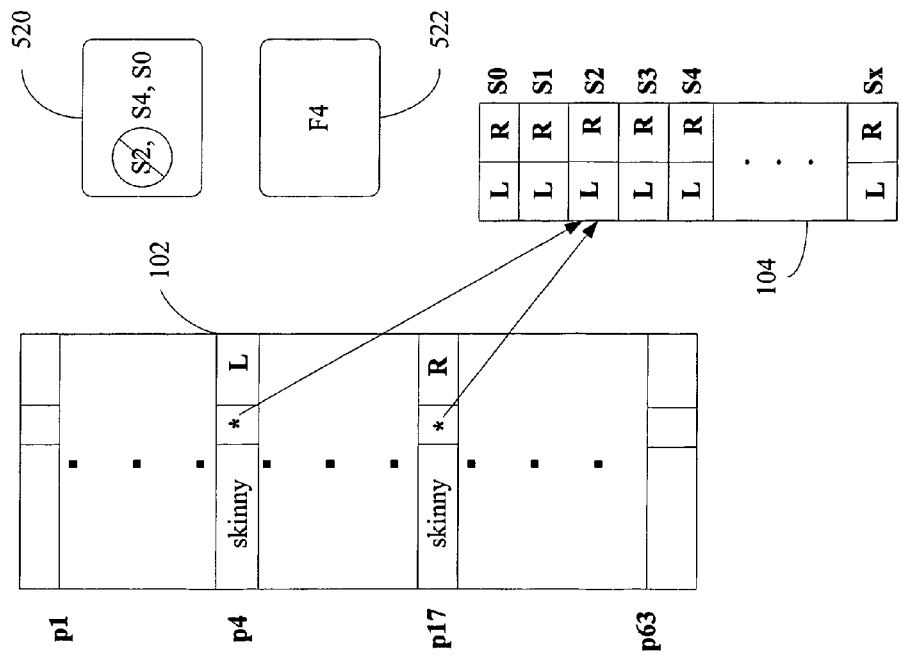

At block 403 logical source registers r2 and r3 are mapped to a standard physical rename register (not shown) in a known manner. FIG. 7 illustrates the resulting change to the source instruction, wherein the instruction is modified to reflect the skinny physical rename register S2.

FIG. 7 illustrates that for sample instruction 1 the first skinny register, S2, in the skinny register pool 520 is allocated 410 for the two destination predicate bits p4 and p17. As part of the allocation operation 410, the entries of the map rename table 102 that correspond to predicate bits p4 and p17 are modified at block 506. That is, the rename map table 102 entry corresponding to predicate p4 is modified to indicate the left bit of the S2 skinny physical rename register. Similarly, the rename map table 102 entry corresponding to predicate p17 is modified to indicate the right bit of the S2 skinny physical rename register.

FIG. 7 further illustrates the changes to the rename map table 102 and the skinny register pool 520 that occur during renaming 400 for the second instruction in the sample instruction stream. At block 403 logical source registers r3 and r4 are mapped to a standard physical rename register (not shown) in a known manner. FIG. 7 illustrates the resulting change to the source instruction, wherein the instruction is modified to reflect the skinny physical rename register S4.

At block 404 it is determined that the second instruction writes two predicate bits. Because the second instruction is a partial-access instruction, a skinny physical rename register 104 is allocated at block 410. Accordingly, at block 410 the next skinny register, S4, in the skinny register pool is allocated for predicate bits p4 and p5.

As part of the allocation operation 410, the entries of the map rename table 102 that correspond to predicate bits p4 and p5 are modified at block 506. That is, the rename map table 102 entry corresponding to predicate p4 is modified to indicate the left bit of the S4 skinny physical rename register. Similarly, the rename map table 102 entry corresponding to predicate p5 is modified to indicate the right bit of the S4 skinny physical rename register.

Figure 8:
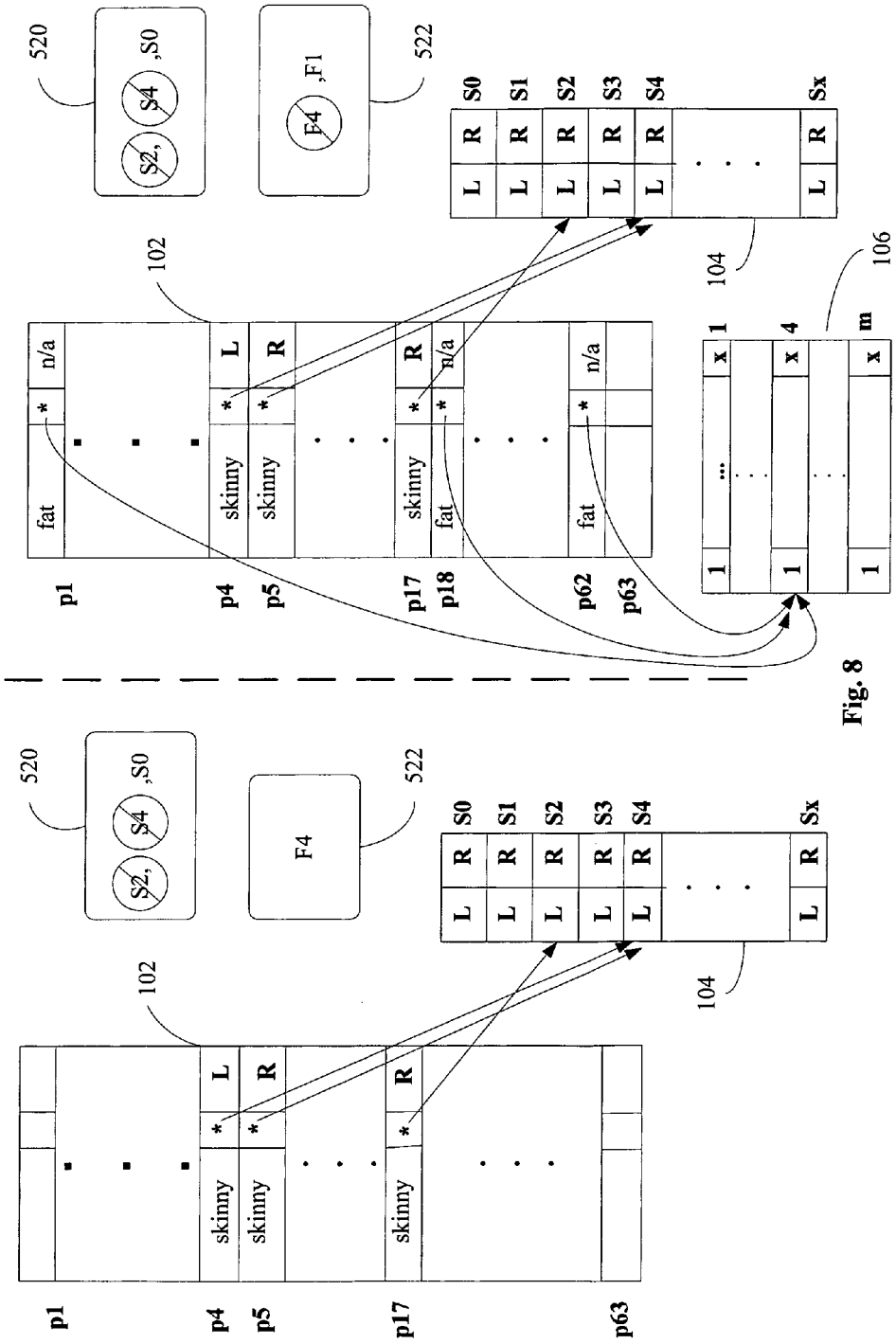
FIG. 8 is a data flow diagram illustrating flow of data during renaming for a third and fourth sample instruction in an example instruction stream.

FIG. 8 illustrates that no change to the rename map table 102 occurs during execution of the third instruction in the sample instruction stream. For this third instruction, at block 403 logical source register p17 is mapped to the appropriate physical rename register. This mapping 403 is accomplished, for at least one embodiment, by modifying the current instruction to indicate that the physical rename register S4 that has been previously allocated 410 for the source operand p17. In addition, mapping for non-MBF logical register r1 is performed in a known manner.

The method 400 determines at block 404 the current instruction does not indicate an MBF register as a destination register. Accordingly, allocation 406 of a standard rename register (not shown) for logical register r2 occurs in a known manner. Processing then ends at block 418.

FIG. 8 illustrates that upon a read of the rename map table's 102 actual entry for p17, the method 400 may determine that the pointer in the register identifier field 204 of the actual entry for p17 indicates the Right bit of S4. Accordingly, FIG. 8 illustrates that the third instruction is modified 406 to indicate that p17 has been mapped to S4. Although not illustrated in FIG. 8, the current instruction may also be modified to indicate the physical rename register allocated 411 for the non-MBF destination register, r1.

FIG. 8 also illustrates changes to the rename map table 102 and fat register pool 522 that the method 400 effects during renaming of the fourth instruction in the sample instruction stream. The fourth instruction, "mov pr=r2, mask", is a bulk-bit access instruction. The instruction supports a bulk multi-bit write to all, or any subset of, the bits of the predicate register 108 (FIG. 1). Those bits indicated as "true" in the immediate mask value are written with the value at that bit position in the source operand register r2. For ease of illustration, it is assumed that the immediate mask value for the fourth instruction indicates that predicate bits 1, 18 and 62 are to be written as a result of the fourth instruction.

Although not illustrated in FIG. 8, the fourth instruction may be modified 403 to indicate the physical rename register previously allocated 411 for the non-MBF destination source, r2.

For the fourth instruction, the method 400 determines at block 404 that the current instruction writes an MBF register as a destination. Accordingly, processing proceeds to block 410.

At block 410, a physical rename register is allocated for the destination register (PR) of the fourth instruction. Reference to FIG. 5 indicates that the appropriate size is determined at block 502. For the fourth instruction, it is determined 502 that a fat physical rename register 106 is appropriate because the instruction is a bulk-bit access instruction. That is, depending on the value of the immediate mask value, any or all of the bits in the predicate register 108 (FIG. 1) may be written. Accordingly, at block 504 a fat physical rename register 106 is selected.

FIG. 8 illustrates that the next fat physical rename register 106 in the fat register pool 522 is F4. FIG. 8 illustrates that F4 is thus selected at block 504 and is removed from the pool 522.

At block 506 the appropriate entries in the rename map table 102 are modified to point to the selected fat physical rename register, F4. Accordingly, FIG. 8 illustrates that the rename map table 102 entries for predicate bits 1, 18 and 82 are modified to point to F4.

At block 508 the fourth instruction is modified to reflect that the logical predicate register has been renamed to fat physical rename register F4.

Figure 9:
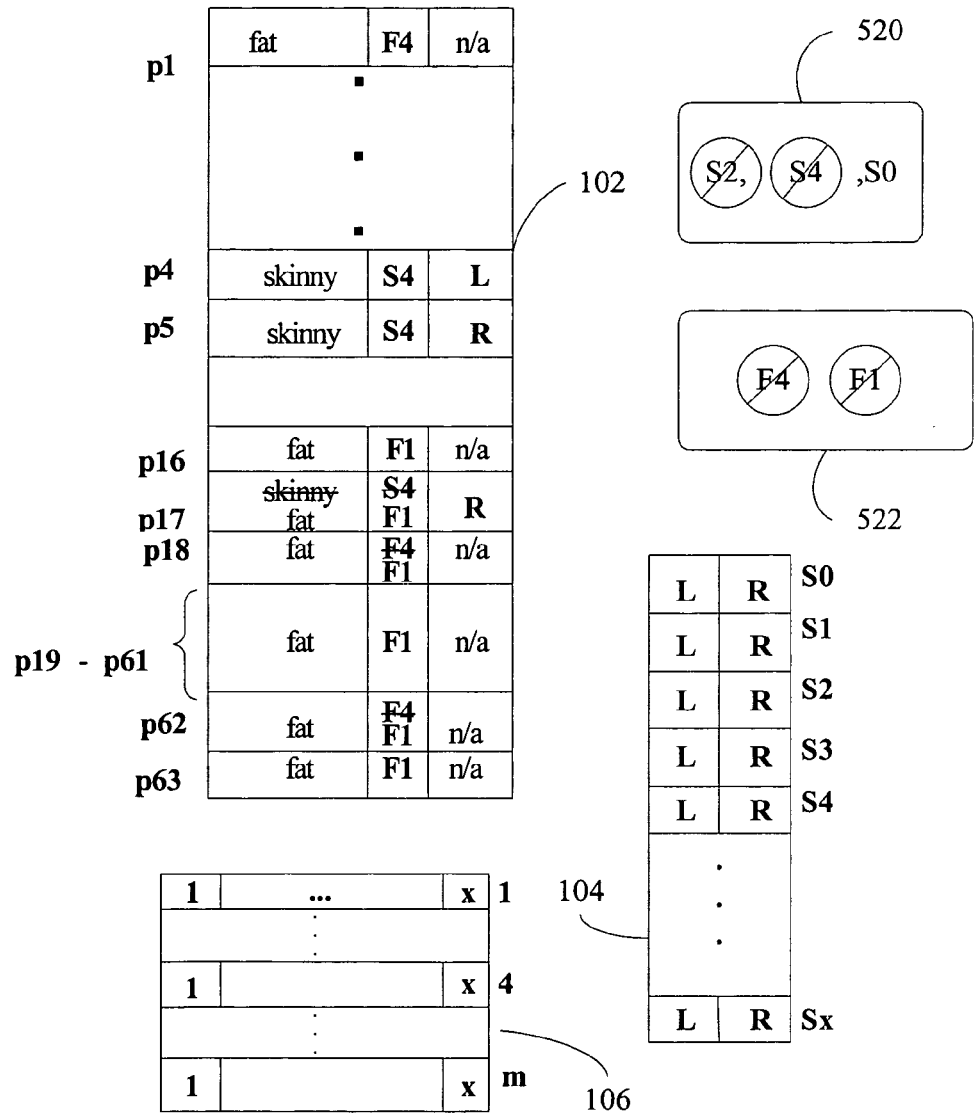
FIG. 9 is a data flow diagram illustrating flow of data during renaming for a fifth sample instruction in an example instruction stream.

FIG. 9 illustrates changes to the rename map table 102 and fat register pool 522 that the method 400 effects during renaming of the fifth instruction in the sample instruction stream. The fifth instruction, "mov pr.rot=immed", is a bulk-bit access instruction. The instruction supports a bulk multi-bit write to the 48 most significant bits of the predicate register 108 (FIG. 1). The value in bit position i of the immediate source operand is coped to PR[i]. For ease of illustration, the value in the immed field is disregarded relative to discussion of FIG. 9. Regardless of the immed value, all of the 48 most significant bits of the predicate register 108 (FIG. 1) are written.

For the fifth instruction, the method 400 determines at block 404 that the current instruction is an MBF instruction. Accordingly, processing proceeds to block 408. At block 408 the method 40 determines that the current instruction indicates that the source register is an MBF register. Processing then proceeds to block 410.

At block 410, a physical rename register is allocated for the destination register (PR) of the fifth instruction. Reference to FIG. 5 indicates that the appropriate size is determined at block 502. For the fifth instruction, it is determined 502 that a fat physical rename register 106 is appropriate because the instruction is a bulk-bit access instruction. That is, all of the 48 most significant bits of the PR are written responsive to the fifth instruction. Accordingly, at block 504 a fat physical rename register 106 is selected.

FIG. 9 illustrates that the next fat physical rename register 106 in the fat register pool 522 is F1. FIG. 9 illustrates that F1 is thus selected at block 504 and is removed from the pool 522.

At block 506 the appropriate entries in the rename map table 102 are modified to point to the selected fat physical rename register, F4. Accordingly, FIG. 8 illustrates that the rename map table 102 entries for predicate bits 16–63 are modified to point to F4. For ease of illustration, the pointer values in the register identifier fields 204 of the actual entries of the rename map table 102 are represented differently in FIG. 9 that in previous figures. Instead of illustrating a graphic arrow to show which physical rename register an actual entry points to, FIG. 9 illustrates the name of the physical rename register pointed to.

At block 508 the fifth instruction is modified to reflect that the logical predicate register has been renamed to fat physical rename register F1.

The foregoing discussion discloses selected embodiments of an apparatus and method for renaming for registers for which different variations of bit fields may be accessed. The method 400 described herein may be performed on a processing system such as the processing system 1000 illustrated in FIG. 10.

Figure 10:
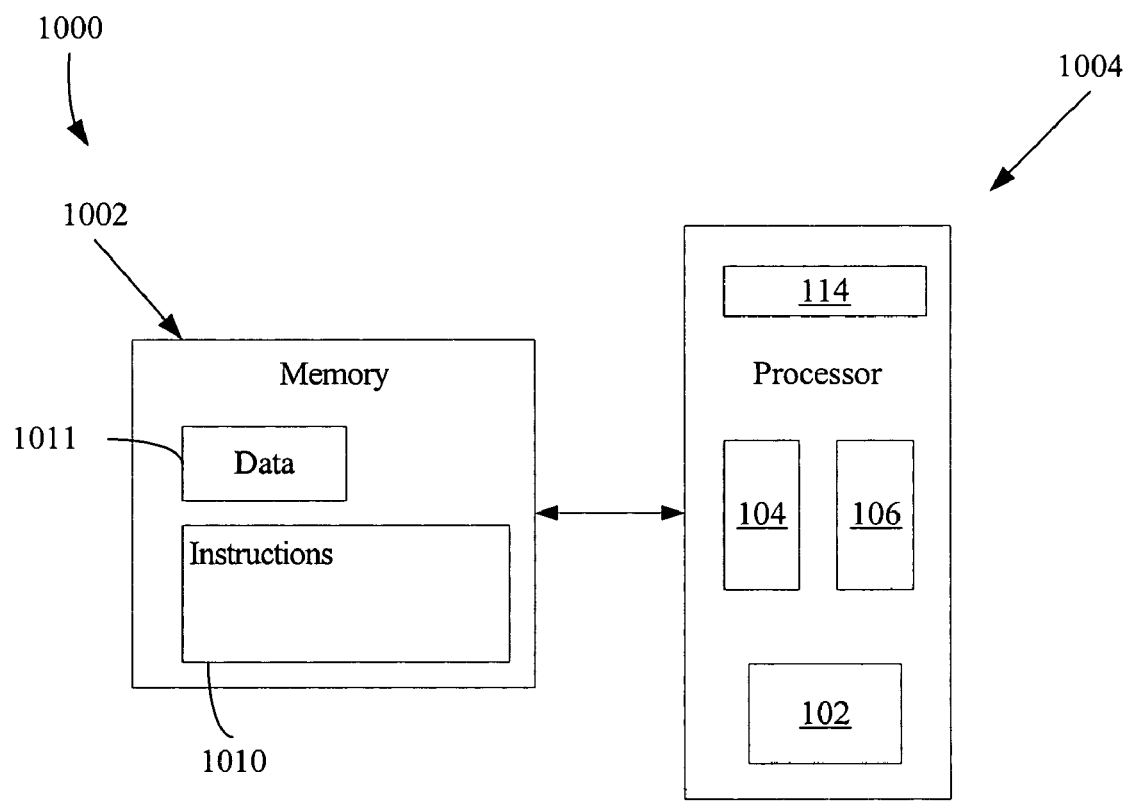
FIG. 10 is a block diagram of at least one embodiment of a processing system capable of utilizing fat/skinny renaming techniques as disclosed herein.

FIG. 10 illustrates at least one embodiment of a processing system 1000 that may utilize disclosed techniques. System 1000 may be used, for example, to execute a method for renaming, such as the embodiments described herein. For purposes of this disclosure, a processing system includes any system that has a processor, such as, for example; a digital signal processor (DSP), a microcontroller, an application specific integrated circuit (ASIC), or a microprocessor. System 1000 is representative of processing systems based on the Itanium® and Itanium® II microprocessors as well as the Pentium®, Pentium® Pro, Pentium® II, Pentium® III, Pentium® 4 microprocessor, all of which are available from Intel Corporation. Other systems (including personal computers (PCs) having other microprocessors, engineering workstations, personal digital assistants and other hand-held devices, set-top boxes and the like) may also be used. In one embodiment, system 1000 may be executing a version of the Windows™ operating system available from Microsoft Corporation, although other operating systems and graphical user interfaces, for example, may also be used.

Referring to FIG. 10, processing system 1000 includes a memory system 1002 and a processor 1004 that includes rename logic 114, skinny physical rename registers 104, fat physical rename registers 106 and a rename map table 102 of the format shown in FIG. 1. Memory system 1002 may store instructions 1010 and data 1011 for controlling the operation of the processor 1004.

Memory system 1002 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1002 may store instructions 1010 and/or data 1011 represented by data signals that may be executed by processor 1004. The instructions 1010 may include bundled instructions as discussed herein.

In the preceding description, various aspects of a method and apparatus for renaming all bits or specified bits of an MBF register have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

While particular embodiments of the present invention have been shown and described, it will be obvious to those skilled in the art that changes and modifications can be made without departing from the present invention in its broader aspects. For example, one of skill in the art will recognize that the method 400 described herein may utilize more than two sizes of physical rename registers. For such embodiments, any number n of physical rename register sizes may be utilized, where n>0. For such embodiments, the length of each of the n sizes of registers is distinct from the lengths of the other sizes and the format 210 illustrated in FIG. 2 may be utilized to specify n register types 202. The appended claims are to encompass within their scope all such changes and modifications that fall within the true scope of the present invention.

What is claimed is:

1. An apparatus comprising:
a storage structure to store at least one entry, the at least one entry to include a register identifier value;
a first physical rename register of a first length;
a second physical rename register of a second length different than the first length, wherein the first and second rename registers are distinct from each other and do not share any common bits;
a logical register; and
rename logic to map an instance of the logical register to a selected physical rename register, where the selected physical rename register is selected from a plurality of registers comprising the first physical rename register and the second physical rename register;
wherein the register identifier value is to indicate a current length, wherein the current length is selected from a set including the first length and the second length;
wherein the logical register includes a plurality of x bit positions;
wherein a selected one of the x bit positions may be accessed individually responsive to a first instruction that indicates the selected bit position;
wherein all x bit positions may be accessed together responsive to a second instruction; and
the rename logic is further to allocate the first physical rename register responsive to the first instruction, the rename logic further to allocate the second physical rename register responsive to the second instruction.

2. The apparatus of claim 1, wherein:
a subset including y of the x bits may be accessed responsive to a third instruction, where y>1; and
the rename logic is further to allocate the first physical rename register responsive to the third instruction.

3. The apparatus of claim 2, wherein:
the length of the first physical rename register includes y bit positions.

4. The apparatus of claim 3, wherein:
the entry is further to include a position identifier, the position identifier to indicate a selected one of the y bit positions of the first physical rename register.

5. The apparatus of claim 4, wherein:
the selected one of the y bit positions of the first physical rename register corresponds to the selected bit position indicated by the first instruction.

6. A method comprising:
determining that a current instruction indicates as a destination register a multiple-bit-field (MBF) predicate register having n bit positions, where n>1; and
allocating a physical rename register for the destination register;
wherein allocating further comprises allocating a physical rename register of a first length responsive to the current instruction indicating a partial-bit write of only 1 bit position of the MBF predicate register and further comprises allocating a physical rename register of a second length responsive to the current instruction indicating a bulk-bit write of x bit positions of the predicate register, where x is greater than 1 and x is less than or equal to n.

7. The method of claim 6, wherein:
allocating further comprises modifying a rename map table to indicate the allocated physical rename register.

8. The method of claim 6, wherein:
the allocating further includes allocating a physical rename register of the first length responsive to the current instruction indicating a partial-bit write of y bit positions of the predicate register, where 1<y<x.

9. The method of claim 8, wherein:
the y bit positions are contiguous.

10. The method of claim 6, wherein:
the x bit positions are contiguous.

11. The method of claim 6, wherein:
the allocating further comprises allocating a physical rename register of the second length responsive to the current instruction indicating a bulk-bit write of all n bit positions of the predicate register.

12. The method of claim 8, wherein:
y=2.

13. The method of claim 8, wherein:
y=4.

14. The method of claim 6, further comprising:
modifying the current instruction to indicate the allocated physical rename register in place of the MBF register.

* * * * *